US008421585B2

(12) United States Patent
Namioka

(10) Patent No.: US 8,421,585 B2
(45) Date of Patent: Apr. 16, 2013

(54) ALARM APPARATUS AND MANUFACTURING METHOD

(75) Inventor: Yasuo Namioka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1142 days.

(21) Appl. No.: 11/771,487

(22) Filed: Jun. 29, 2007

(65) Prior Publication Data
US 2008/0084297 A1    Apr. 10, 2008

(30) Foreign Application Priority Data

Jun. 30, 2006  (JP) ................. 2006-182548
Jun. 15, 2007  (JP) ................. 2007-158970

(51) Int. Cl.
*G06B 21/00*    (2006.01)
(52) U.S. Cl.
USPC ............ 340/3.43; 340/540; 340/635; 702/81; 702/82; 382/144; 382/145

(58) Field of Classification Search ........... 340/635, 340/540, 3.43; 702/81–84; 324/762; 356/237.2–237.5; 382/144–152
See application file for complete search history.

(56) References Cited

U.S. PATENT DOCUMENTS

| 2003/0174878 A1* | 9/2003 | Levin et al. .................. 382/149 |
| 2004/0032979 A1* | 2/2004 | Honda et al. .................. 382/145 |
| 2004/0044484 A1* | 3/2004 | Obara et al. .................... 702/35 |
| 2004/0218807 A1* | 11/2004 | Alumot et al. ................. 382/149 |
| 2006/0012782 A1* | 1/2006 | Lim et al. .................... 356/237.5 |
| 2006/0181700 A1* | 8/2006 | Andrews et al. ............ 356/237.2 |

FOREIGN PATENT DOCUMENTS

JP    2005-197629    7/2005

* cited by examiner

*Primary Examiner* — Jennifer Mehmood
*Assistant Examiner* — Mark Rushing
(74) *Attorney, Agent, or Firm* — Oblon, Spivak, McClelland, Maier & Neustadt, L.L.P.

(57) ABSTRACT

An alarm apparatus for sensing occurrence of abnormality in a plant that manufactures products by processing substrates, the alarm apparatus includes: means responsive to an inspection result of a surface of the substrates during manufacturing the products for aggregating degree of occurrence of defects for each monitoring unit region to produce an aggregation result, the monitoring unit region having a prescribed size configured for each type of the abnormality; means for comparing the degree of occurrence of defects in each of the monitoring unit regions with a reference; and means responsive to detection of the monitoring unit region with the degree of occurrence of defects being higher than the reference for transmitting an alarm and outputting the aggregation result.

16 Claims, 14 Drawing Sheets

| PROCESS | INSPECTION STEP | MONITORED STEP |
|---|---|---|
| POLYSILICON | STEP10 | STEP1 ~ STEP10 |
| GATE ELECTRODE | STEP20 | STEP11 ~ STEP20 |
| $P^+$-ION DOPING | STEP30 | STEP21 ~ STEP30 |
| CONTACT HOLE | STEP40 | STEP31 ~ STEP40 |
| INTERCONNECT | STEP50 | STEP41 ~ STEP50 |
| COLOR FILTER | STEP60 | STEP51 ~ STEP60 |
| (ENTIRE ARRAY SUBSTRATE) | STEP61 | STEP1 ~ STEP61 |

FIG. 6

| INSPECTION STEP | DEFECT LEVEL | CAUSAL STEP | CAUSAL CANDIDATE APPARATUS | APPARATUS COMMONALITY | AGGREGATION MAP |
|---|---|---|---|---|---|
| STEP10 | 3 | STEP7 | #2 | 80% |  |
| STEP10 | 3 | STEP8 | #2 | 76% |  |
| STEP30 | 2 | STEP23 | #1 | 74% |  |
| STEP50 | 1 | STEP46 | #9 | 70% |  |

ALARM APPARATUS AND MANUFACTURING METHOD

CROSS-REFERENCE TO RELATED APPLICATIONS

This application is based upon and claims the benefit of priorities from the prior Japanese Patent Application No. 2006-182548, filed on Jun. 30, 2006, and the prior Japanese Patent Application No. 2007-158970, filed on Jun. 15, 2007; the entire contents of which are incorporated herein by reference.

BACKGROUND OF THE INVENTION

1. Field of the Invention

This invention relates to an alarm apparatus and manufacturing method, and more particularly to an alarm apparatus and manufacturing method for monitoring a plant and sensing occurrence of abnormality in the plant, the plant manufacturing products by processing substrates.

2. Background Art

In the conventional process for monitoring occurrence of abnormality in a plant, typically, an engineer uses a visualization tool to examine the number of defects for each product sheet, detects any abnormalities from the number of defects and the degree of concentration thereof, and reports them. However, such work may miss abnormalities at times. Even if abnormality is detected, its cause is not automatically identified. Hence, even if any abnormality occurs in the plant, there is a time lag of typically half a day to several days until the abnormality is detected on the basis of the trend of product defects and its cause is identified. This time lag has been a significant factor in decreased yield. Furthermore, the work of sensing occurrence of abnormality from the trend of the number of defects and the degree of concentration thereof to identify its cause relies on engineers' sense and experience, and unfortunately depends on engineers' personal ability.

On the other hand, conventionally, apparatuses intended for automatically detecting defects are also proposed (see, e.g., JP 2005-197629A). However, defects typically occur at some frequency even when the manufacturing apparatus is normally operated. When abnormality occurs in the manufacturing apparatus, the degree of occurrence of defects is deteriorated. However, how it is deteriorated depends on the type of abnormality. Hence it is difficult to automatically detect abnormality in the manufacturing apparatus from the inspection result of the product.

SUMMARY OF THE INVENTION

According to an aspect of the invention, there is provided an alarm apparatus for sensing occurrence of abnormality in a plant that manufactures products by processing substrates, the alarm apparatus including: means responsive to an inspection result of a surface of the substrates during manufacturing the products for aggregating degree of occurrence of defects for each monitoring unit region to produce an aggregation result, the monitoring unit region having a prescribed size configured for each type of the abnormality; means for comparing the degree of occurrence of defects in each of the monitoring unit regions with a reference; and means responsive to detection of the monitoring unit region with the degree of occurrence of defects being higher than the reference for transmitting an alarm and outputting the aggregation result.

According to another aspect of the invention, there is provided a manufacturing method for manufacturing products by processing substrates, the method including: inspecting a surface of the substrates during manufacturing the products and aggregating degree of occurrence of defects for each monitoring unit region to produce an aggregation result, the monitoring unit region having a prescribed size configured for each type of the abnormality; comparing the degree of occurrence of defects in each of the monitoring unit regions with a reference; and transmitting an alarm and outputting the aggregation result if the monitoring unit region where the degree of occurrence of defects is higher than the reference is detected.

BRIEF DESCRIPTION OF THE DRAWINGS

FIG. 6 illustrates steps in the array process.

DETAILED DESCRIPTION OF THE INVENTION

An embodiment of the invention will now be described with reference to the drawings.

Figure 1:
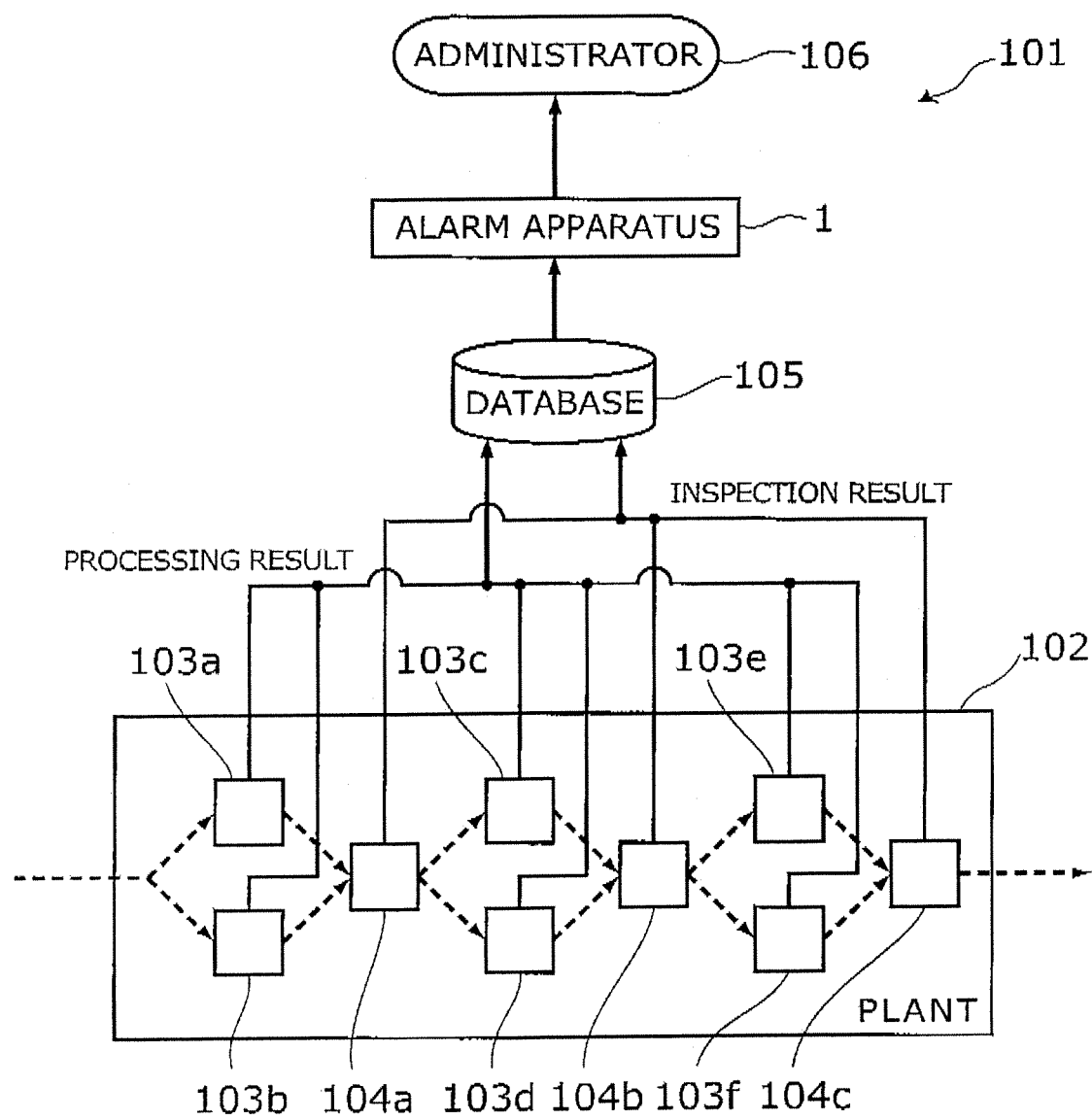
FIG. 1 illustrates an alarm apparatus according to an embodiment of the invention, a plant to be monitored by this alarm apparatus, and a quality control system including an administrator of this plant.

FIG. 1 illustrates an alarm apparatus according to an embodiment of the invention, a plant to be monitored by this alarm apparatus, and a quality control system including an administrator of this plant.

In FIG. 1, flow of information is represented by solid lines, and flow of products is represented by dashed lines.

As shown in FIG. 1, the quality control system 101 includes a plant 102 to be monitored. The plant 102 includes a plurality of manufacturing apparatuses 103a to 103f (hereinafter also collectively referred to as "manufacturing apparatuses 103") and a plurality of inspection apparatuses 104a to 104c (hereinafter also collectively referred to as "Inspection apparatuses 104"). The plant 102 serves to manufacture products by processing substrates using a plurality of manufacturing apparatuses 103. For example, the plant 102 manufactures products such as liquid crystal panels or semiconductor chips.

The term "plant" used herein refers to a field having a plurality of manufacturing apparatuses related to each other and transport means for transporting products or semifinished products between these manufacturing apparatuses, where one or more production lines are configured depending on the products to be manufactured. When there are a plurality of types of products to be manufactured, a plurality of production lines may be configured, and the plurality of production lines may share part of the manufacturing apparatuses. In this case, a plurality of production lines intersect at such manufacturing apparatuses. The "plant" is not necessarily limited to what is constructed in one building, but may be located across a plurality of buildings or sites, or may be installed in part of one clean room.

The manufacturing apparatus 103 performs part of the steps of manufacturing products. In this embodiment, each step is performed in parallel by a plurality of manufacturing apparatuses 103. In the example shown in FIG. 1, the manufacturing apparatuses 103a and 103b perform a common step, and the manufacturing apparatuses 103c and 103d perform another common step, and the manufacturing apparatuses 103e and 103f perform still another common step.

The inspection apparatus 104 inspects the surface of the substrate during and after the manufacturing of the product, and outputs the presence of defects along with their coordinates on the substrate. For example, the inspection apparatus 104 is a particle inspection apparatus for inspecting the presence of dust, a pattern inspection apparatus for inspecting the quality of a circuit pattern formed on the substrate, or an array inspection apparatus for inspecting whether an electronic circuit formed on the substrate is electrically normal. In the example shown in FIG. 1, the plant 102 is laid out so that a substrate is processed by the manufacturing apparatus 103a or 103b and then inspected by the inspection apparatus 104a, processed by the manufacturing apparatus 103c or 103d and then inspected by the inspection apparatus 104b, and processed by the manufacturing apparatus 103e or 103f and then inspected by the inspection apparatus 104c.

The quality control system 101 includes a database 105 for receiving the processing result of the product as input from the manufacturing apparatuses 103 and the inspection result of the product as input from the inspection apparatuses 104 and storing these information items.

Furthermore, the quality control system 101 includes an alarm apparatus 1. As input from the database 105, the alarm apparatus 1 receives defect information about defects in the product, that is, information indicating defects on the substrate and their coordinate information, as well as history information indicating the manufacturing apparatus 103 that processed the product. On the basis of the defect information, the alarm apparatus 1 senses any abnormality occurring in the plant 102 and transmits an alarm to the administrator 106. Furthermore, on the basis of the history information, the alarm apparatus 1 estimates the manufacturing apparatus 103 in which the abnormality occurred. The alarm apparatus 1 may be implemented by programs using an existing personal computer, may be configured as one system LSI (large scale integrated circuit), or may be assembled from a plurality of components each being responsible for an associated function.

Next, the operation of this embodiment is described.

Figure 2A:
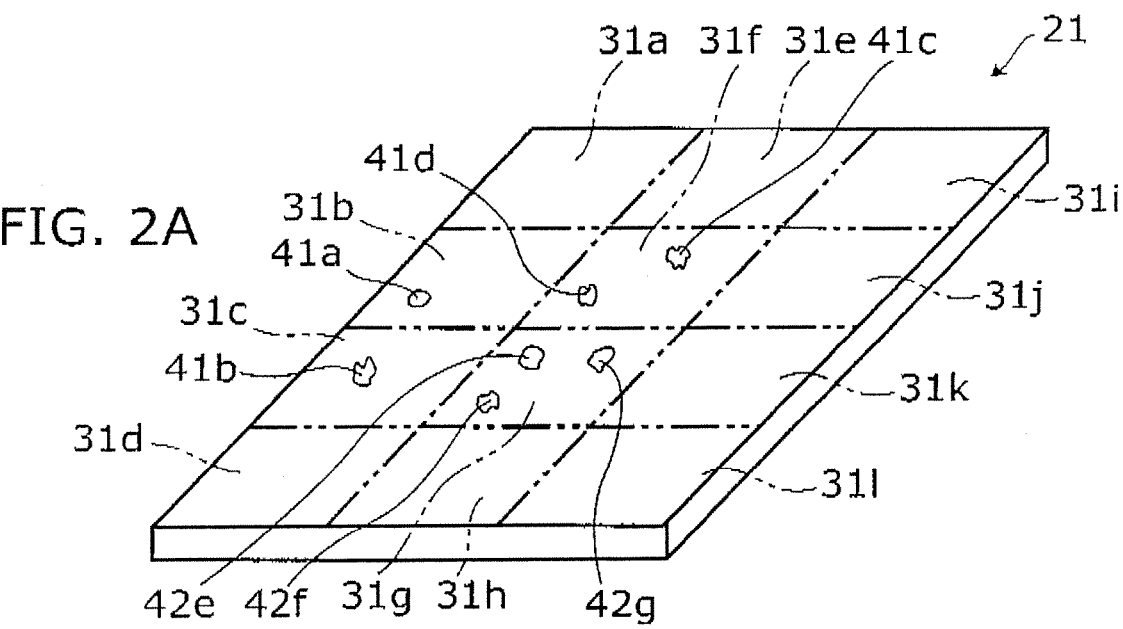
FIG. 2A is a perspective view illustrating a substrate having defects.
Figure 2B:
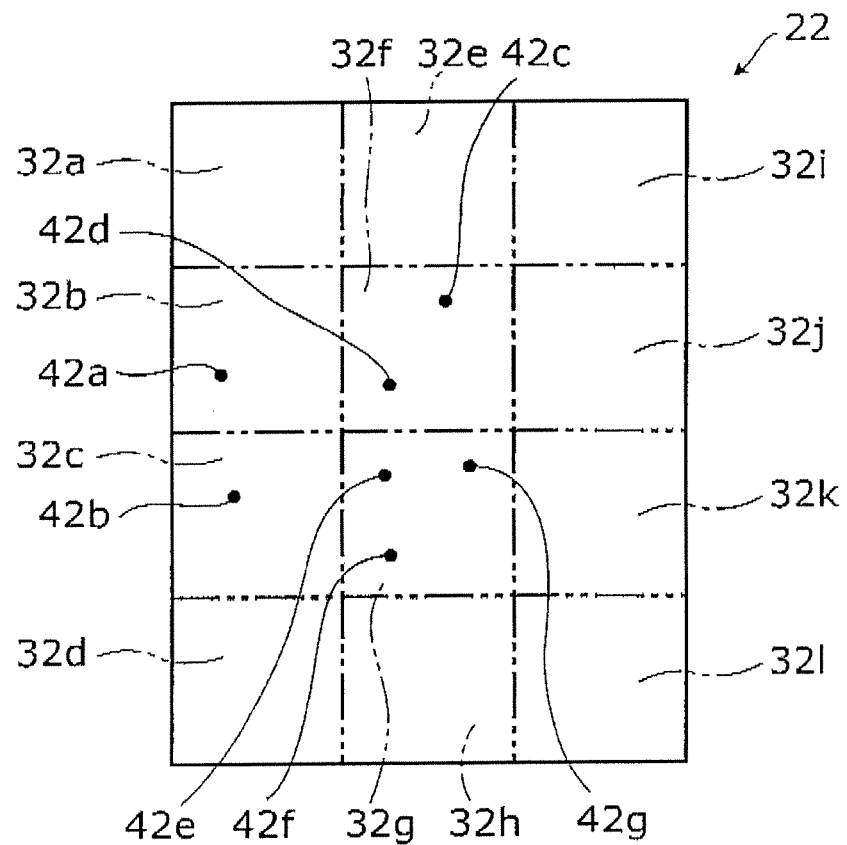
FIG. 2B illustrates an aggregation result for this substrate.

FIG. 2A is a perspective view illustrating a substrate having defects, and FIG. 2B illustrates an aggregation result for this substrate.

Figure 3:
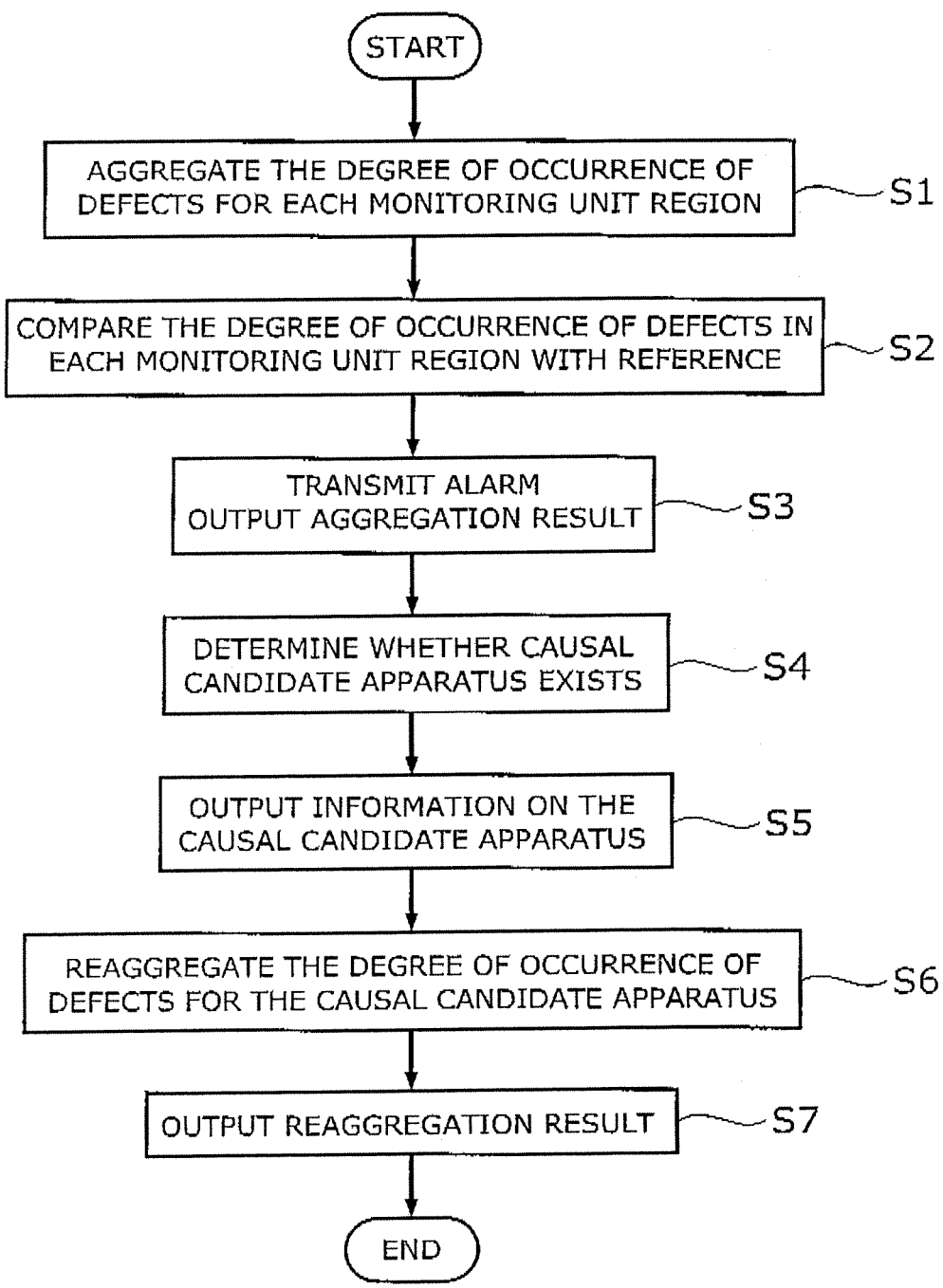
FIG. 3 is a flow chart illustrating the alarm apparatus according to this embodiment.

FIG. 3 is a flow chart illustrating the alarm apparatus according to this embodiment.

First, beforehand, the administrator 106 configures the size of a monitoring unit region (pixel size) for each type of abnormality and inputs it to the alarm apparatus 1. The monitoring unit region is a region serving as a reference for aggregating the inspection result of the substrate to monitor occurrence of abnormality. The optimal size of the monitoring unit region depends on the type of abnormality. For example, if the abnormality to be monitored is the occurrence of static electricity, the monitoring unit region is preferably a region measuring e.g. about 5 millimeters high and 5 millimeters wide. If the abnormality to be monitored is dust fall from above the substrate, the monitoring unit region is preferably a region measuring e.g. about 300 millimeters high and 200 millimeters wide. Thus, as illustrated in FIG. 2A, twelve monitoring unit regions 31a to 31l (hereinafter collectively referred to as "monitoring unit regions 31") are configured as a 4×3 matrix on the surface of the product substrate 21.

On the other hand, as shown in FIG. 1, products are manufactured in the plant 102. The product substrate 21 (see FIG. 2A) is processed by the manufacturing apparatus 103a or 103b and then inspected by the inspection apparatus 104a, processed by the manufacturing apparatus 103c or 103d and then inspected by the inspection apparatus 104b, and subsequently processed by the manufacturing apparatus 103e or 103f and then inspected by the inspection apparatus 104c. Here, in the course of processing by the manufacturing apparatus 103, defects 41a to 41g (hereinafter also collectively referred to as "defects 41") occur on the substrate 21, and these defects 41 are detected by the inspection apparatuses 104 on its downstream side.

The database 105 receives the processing result of the product as input from each manufacturing apparatus 103, and the inspection result of the product as input from each inspection apparatus 104. Next, the information stored in the database 105 is inputted to the alarm apparatus 1 as defect information indicating the presence of defects and their coordinates and history information indicating the history of the product.

In step S1 of FIG. 3, on the basis of the inputted defect information, the alarm apparatus 1 sums the inspection results of a prescribed number of substrates 21 and aggregates the degree of occurrence of defects 41 for each monitoring unit region 31. Next, in step S2, on the basis of this aggregation result, the degree of occurrence of defects in each monitoring unit region is compared with a reference. Thus a monitoring unit region having a high degree of occurrence of defects (hereinafter also referred to as "defect concentration region") is detected. Specifically, for example, the number of defects 41 that occurred in each monitoring unit region is compared with a prescribed reference value, and the monitoring unit region 31 is designated as a defect concentration region if the number of defects is larger than the reference value.

In the example shown in FIG. 2A, the number of defects in the monitoring unit region 31g is three, the number of defects in the monitoring unit region 31f is two, the number of defects in the monitoring unit regions 31b and 31c is one, and the number of defects in the other monitoring unit regions is zero. If the reference value is set to two, for example, the monitoring unit region 31g with the number of defects being three is designated as a defect concentration region.

If any monitoring unit region with the degree of occurrence of defects being higher than the reference (defect concentration region) is detected, control proceeds to step S3, where an alarm is transmitted to the administrator 106, and the aggregation result is outputted. Here, as shown in FIG. 2B, in this output, a drawing 22 representing the surface of the substrate 21 is created, and points 42a to 42g (hereinafter also collectively referred to as "points 42") indicating the defects are displayed at positions in the drawing 22 corresponding to the positions of occurrence of the defects 41 on the substrate 21. In the drawing 22, display unit regions 32a to 32l corresponding to the monitoring unit regions 31a to 31l on the substrate 21 are configured, and the number of defects in the monitoring unit region corresponding to each display unit region is displayed by a numeral, for example.

Next, control proceeds to step S4. On the basis of the history information inputted from the database 105, it is determined whether there is any manufacturing apparatus 103 (hereinafter also referred to as "causal candidate apparatus") that processed a prescribed proportion or more of the substrates on which a defect concentration region is detected. If there is any causal candidate apparatus, control proceeds to step S5, where information indicating the causal candidate apparatus is outputted to the administrator 106.

Next, control proceeds to step S6. Among the substrates on which a defect concentration region is detected, only the substrates processed by one of the causal candidate apparatuses extracted in step S4 are again subjected to aggregation of the degree of defects for each monitoring unit region. This aggregation is performed for every causal candidate apparatus. Then, in step S7, the aggregation result is outputted to the administrator 106. This output is performed in the same manner as in step S3.

Next, the effect of this embodiment is described.

In this embodiment, the degree of occurrence of defects is aggregated for each monitoring unit region, the size of which is configured depending on the type of abnormality. Hence changes in defects due to various types of abnormalities are not missed and can be reliably detected.

Furthermore, in this embodiment, causal candidate apparatuses are extracted, and information indicating them is outputted, where the causal candidate apparatuses are the manufacturing apparatuses that processed a prescribed proportion or more of the substrates on which a defect concentration region is detected. Thus it is possible to assist the administrator to identify manufacturing apparatuses responsible for defects.

Moreover, in this embodiment, among the substrates on which a defect concentration region is detected, only the substrate processed by the causal candidate apparatus is again subjected to aggregation of the degree of defects for each monitoring unit region. Thus it is possible to narrow down the types and sites of abnormalities that occurred in the causal candidate apparatus, and to more effectively assist the administrator to identify causes responsible for defects.

Furthermore, in this embodiment, the inspection results for a plurality of substrates are summed and aggregated. This allows highly reliable detection.

Thus, according to this embodiment, abnormalities in the plant can be automatically detected on the basis of the inspection result of products.

In the following, examples for implementing the above embodiment are described, beginning with a first example.

The alarm apparatus according to this example serves to monitor a plant for manufacturing liquid crystal panels.

Figure 4:
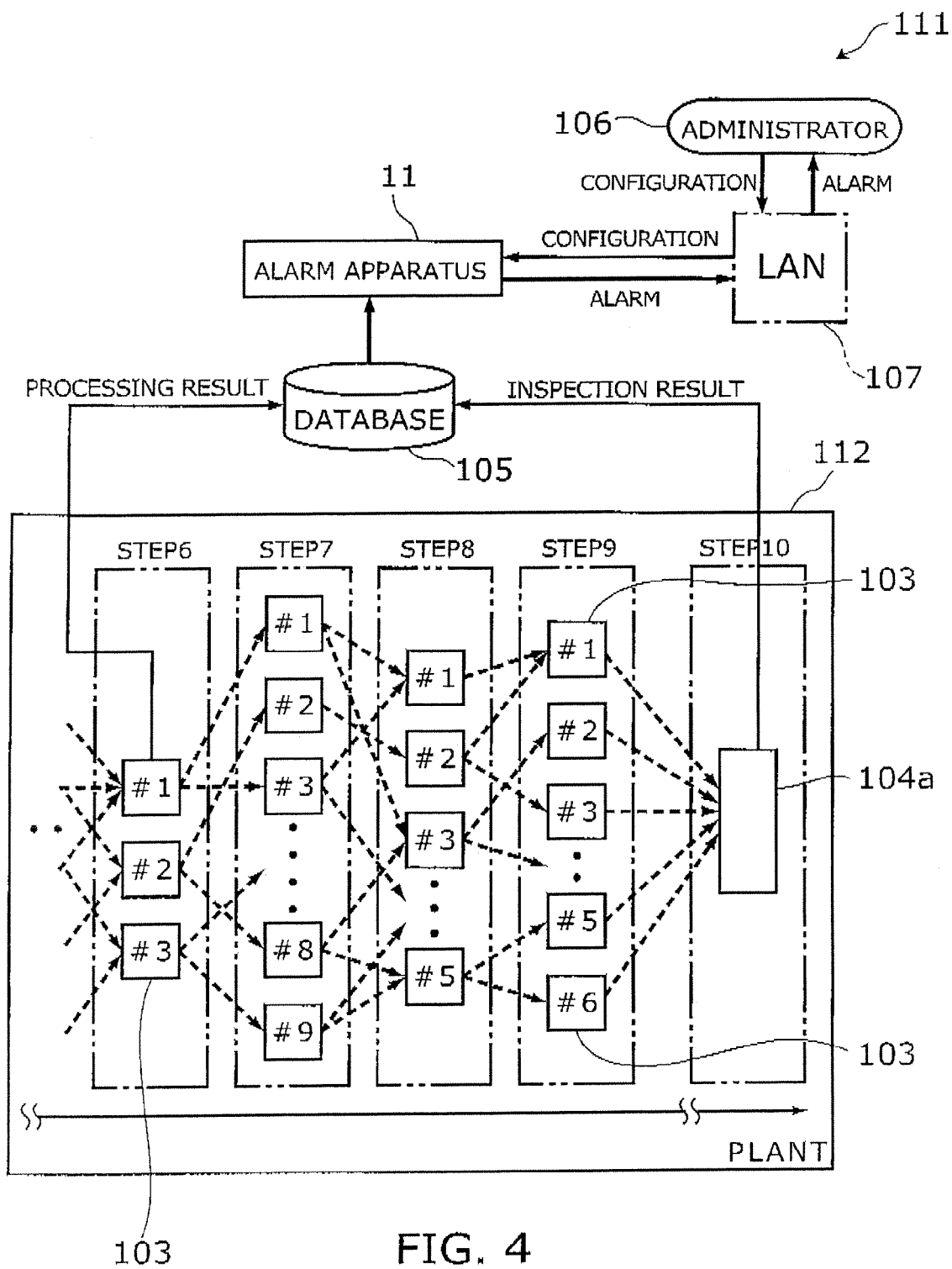
FIG. 4 illustrates an alarm apparatus according to a first example, a plant to be monitored by this alarm apparatus, and a quality control system including an administrator of this plant.

FIG. 4 illustrates an alarm apparatus according to a first example, a plant to be monitored by this alarm apparatus, and a quality control system including an administrator of this plant.

Figure 5:
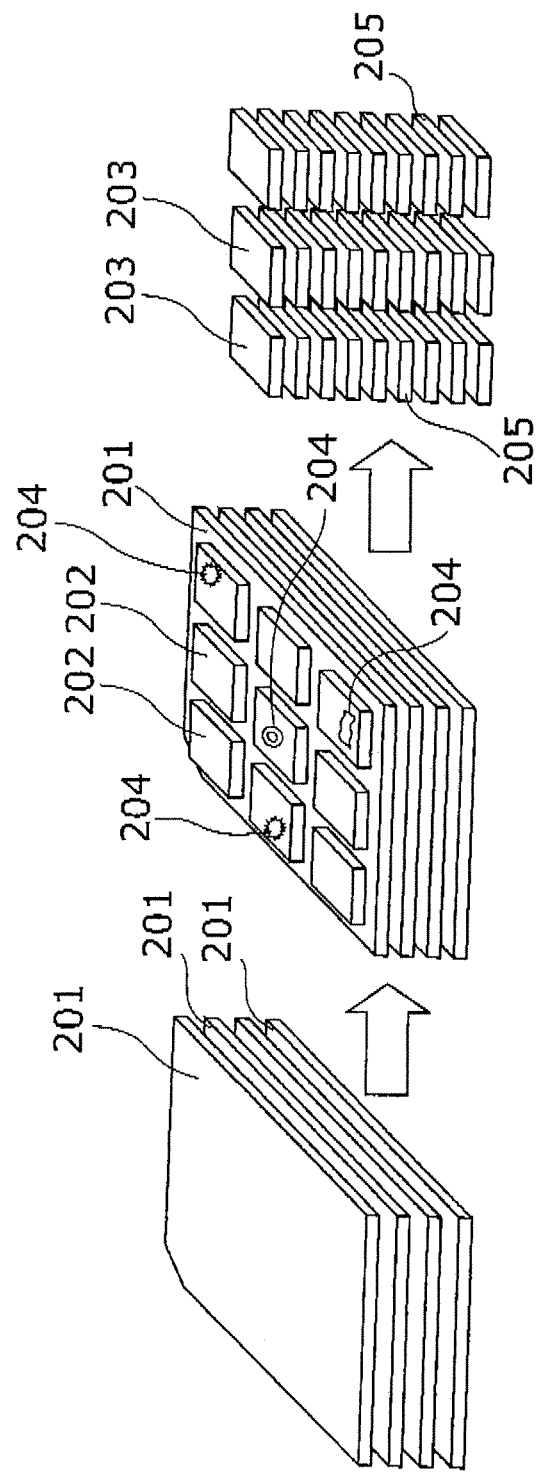
FIG. 5 schematically illustrates a method for manufacturing liquid crystal panels.

FIG. 5 schematically illustrates a method for manufacturing liquid crystal panels.

FIG. 6 illustrates steps in the array process.

In FIG. 4, flow of information is represented by solid lines, and flow of products is represented by dashed lines.

As shown in FIG. 4, the quality control system 111 includes a plant 112 to be monitored. The plant 112 includes a plurality of manufacturing apparatuses 103 and a plurality of inspection apparatuses 104, and manufactures liquid crystal panels as products. The inspection apparatus 104 is illustratively a particle inspection apparatus, a pattern inspection apparatus, or an array inspection apparatus.

The process for manufacturing liquid crystal panels is broadly divided into the array process and the cell process. More specifically, as shown in FIG. 5, electronic circuits 202 are first formed as precursor structures on glass substrates 201. Here, depending on the size of the liquid crystal panel to be manufactured, a plurality of electronic circuits 202 are formed on each glass substrate 201. In the example shown in FIG. 5, nine electronic circuits 202 are formed as a 3×3 matrix on each glass substrate 201. Next, the glass substrate 201 is divided into individual electronic circuits 202. Thus array substrates (not shown) for liquid crystal panels are fabricated. The process thus far is the array process. Next, liquid crystal (not shown) is dripped on the array substrate and sealed by lamination with an opposite substrate (not shown). This is the cell process. Thus liquid crystal panels 203 are manufactured.

The foregoing is a brief description. In reality, manufacturing liquid crystal panels needs a hundred and tens of steps. In the plant 112 (see FIG. 4), each step is processed in parallel by a plurality of manufacturing apparatuses 103. For example, as shown in FIG. 6, the array process for fabricating an array substrate include a polysilicon process for growing a polysilicon layer on a glass substrate, a gate electrode process for forming gate electrodes on the polysilicon layer, a $P^+$-ion doping process for doping the polysilicon layer with $P^+$-ions using the gate electrodes as a mask, a contact hole process for depositing an interlayer insulating film on the polysilicon layer and forming contact holes therein, an interconnect process for forming interconnects on the interlayer insulating film, and a color filter process for forming a color filter (COA: color filter on array) for each cell column. Each of these processes is composed of several steps.

In the example shown in FIG. 6, each process is composed of nine manufacturing steps and one inspection step. The inspection step of each process monitors the manufacturing steps belonging to the same process. The completed array substrate is inspected by inspection step 61. FIG. 4 illustrates only manufacturing steps 6 to 9 and inspection step 10 of the polysilicon process. For example, the sixth step (step 6) is processed in parallel by three manufacturing apparatuses 103 labeled "#1" to "#3". The seventh step (step 7) is processed in parallel by nine manufacturing apparatuses 103 labeled "#1"

to "#9". In the tenth step (step 10), the inspection apparatus 104a inspects substrates. The passage route of liquid crystal panels in the plant 112 depends on the associated lot.

Abnormality occurring in one manufacturing apparatus 103 of one step results in increasing the possibility that a defect occurs in the product passing through this manufacturing apparatus 103. For example, when abnormality occurs in the manufacturing apparatus 103 responsible for part of the process for manufacturing electronic circuits 202, a defect 204 occurs in the electronic circuit 202 formed by this manufacturing apparatus 103, and the liquid crystal panel 203 including this defect 204 becomes a nonconforming panel 205.

On the other hand, the quality control system 111 includes a database 105 for receiving the processing result of the product as input from the manufacturing apparatuses 103 and the inspection result of the product as input from the inspection apparatuses 104 and storing these information items. For simplicity, FIG. 4 shows only the arrow indicating the signal flow from the manufacturing apparatus 103 of "#1" in "step 6" to the database 105. However, in reality, the processing results of all the manufacturing apparatuses 103 are inputted to the database 105.

Furthermore, the quality control system 111 includes an alarm apparatus 11, which receives as input the data stored in the database 105, senses any abnormalities occurring in the plant 112 on the basis of this data, and transmits an alarm to the administrator 106. The data inputted from the database 105 to the alarm apparatus 11 includes defect information indicating defects detected in each inspection apparatus 104 and their coordinates on the glass substrate 201, and history information indicating the manufacturing apparatus 103 involved in manufacturing the product in question.

The alarm apparatus 11 is illustratively implemented as software by programs using an existing personal computer. The alarm apparatus 11 may be configured as hardware by one system LSI, or may be assembled from a plurality of components each being responsible for an associated function.

The alarm apparatus 11 is connected with the administrator 106 through an electronic network. For example, the terminal apparatus (not shown) used by the administrator 106 is connected with the alarm apparatus 11 through a LAN (local area network) 107. This allows the administrator 106 to make various configurations of the alarm apparatus 11 through the LAN 107. Furthermore, the alarm apparatus 11 can transmit an alarm and its various associated information to the administrator 106 through the LAN 107.

Next, the operation of the alarm apparatus according to this example is described.

Figure 7:
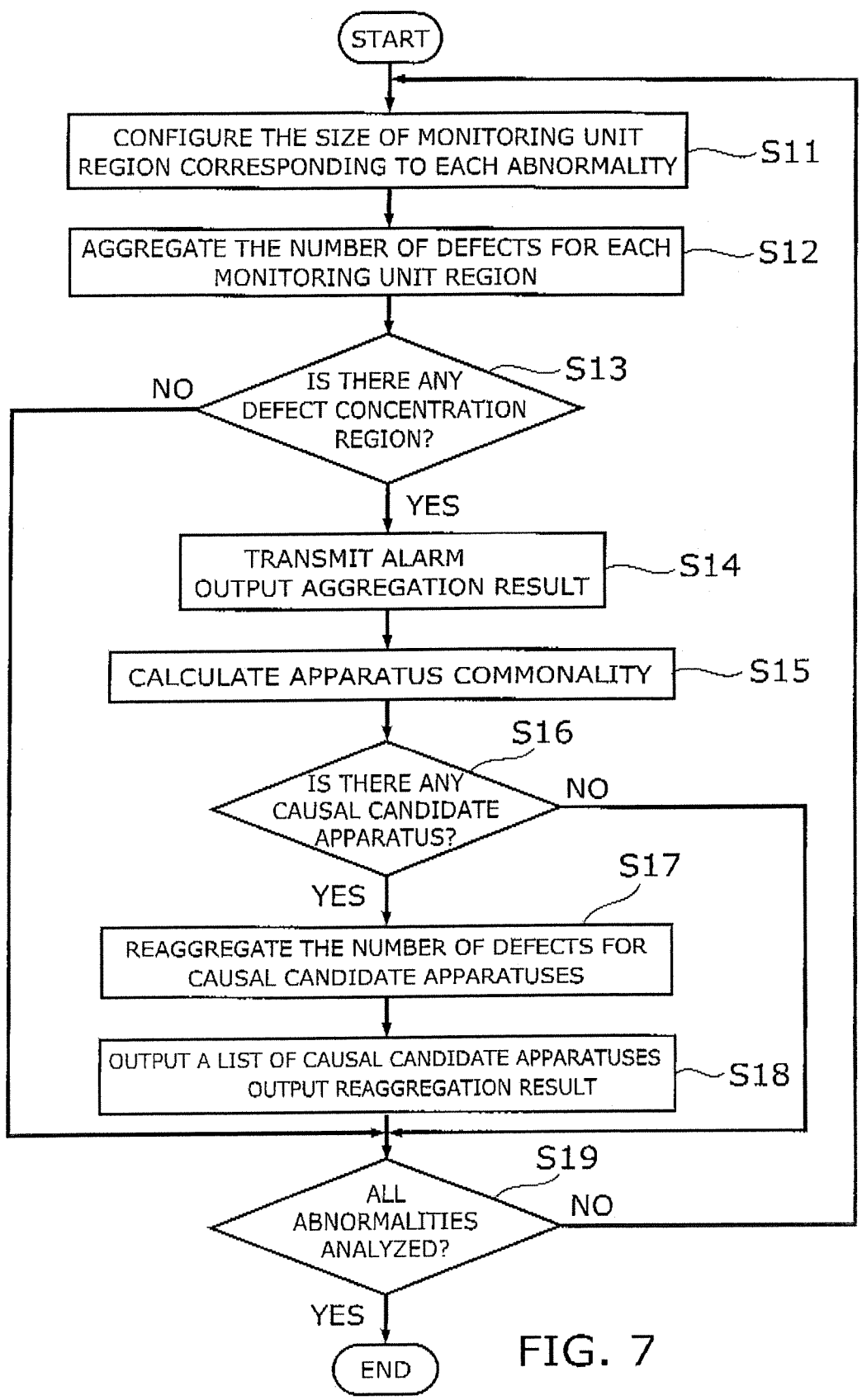
FIG. 7 is a flow chart illustrating the operation of the alarm apparatus according to this example.

FIG. 7 is a flow chart illustrating the operation of the alarm apparatus according to this example.

Figure 8:
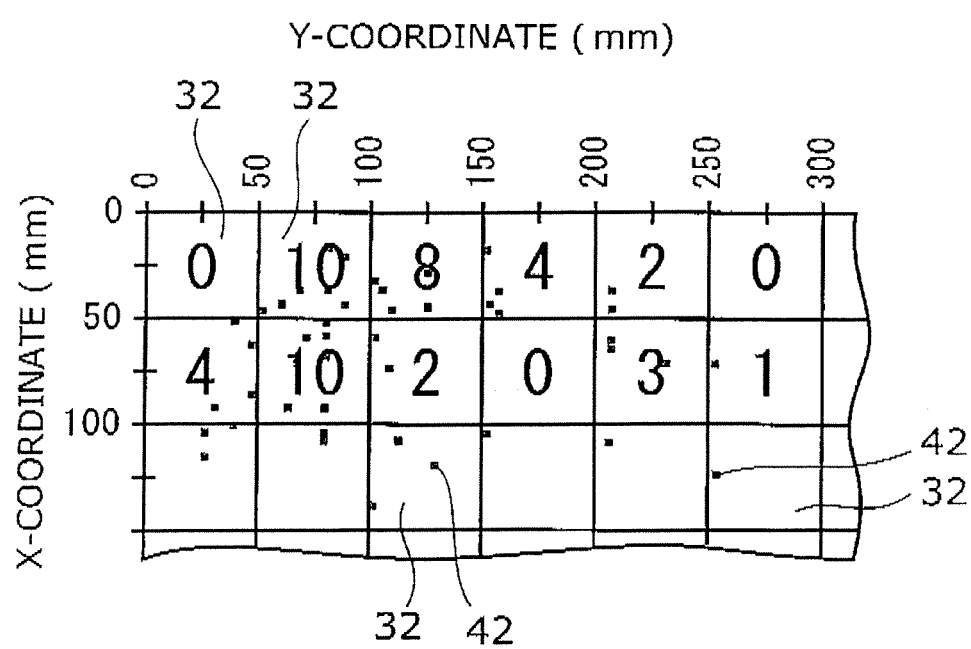
FIG. 8 illustrates an aggregation result of defects, where the horizontal axis represents horizontal position (Y-coordinate) on the glass substrate, the vertical axis represents vertical position (X-coordinate) on the glass substrate, and the surface of the glass substrate is divided vertically into nineteen and horizontally into fifteen, each of the divided regions serving as a monitored region.

FIG. 8 illustrates an aggregation result of defects, where the horizontal axis represents horizontal position (Y-coordinate) on the glass substrate, the vertical axis represents vertical position (X-coordinate) on the glass substrate, and the surface of the glass substrate is divided vertically into nineteen and horizontally into fifteen, each of the divided regions serving as a monitored region.

Figure 9:
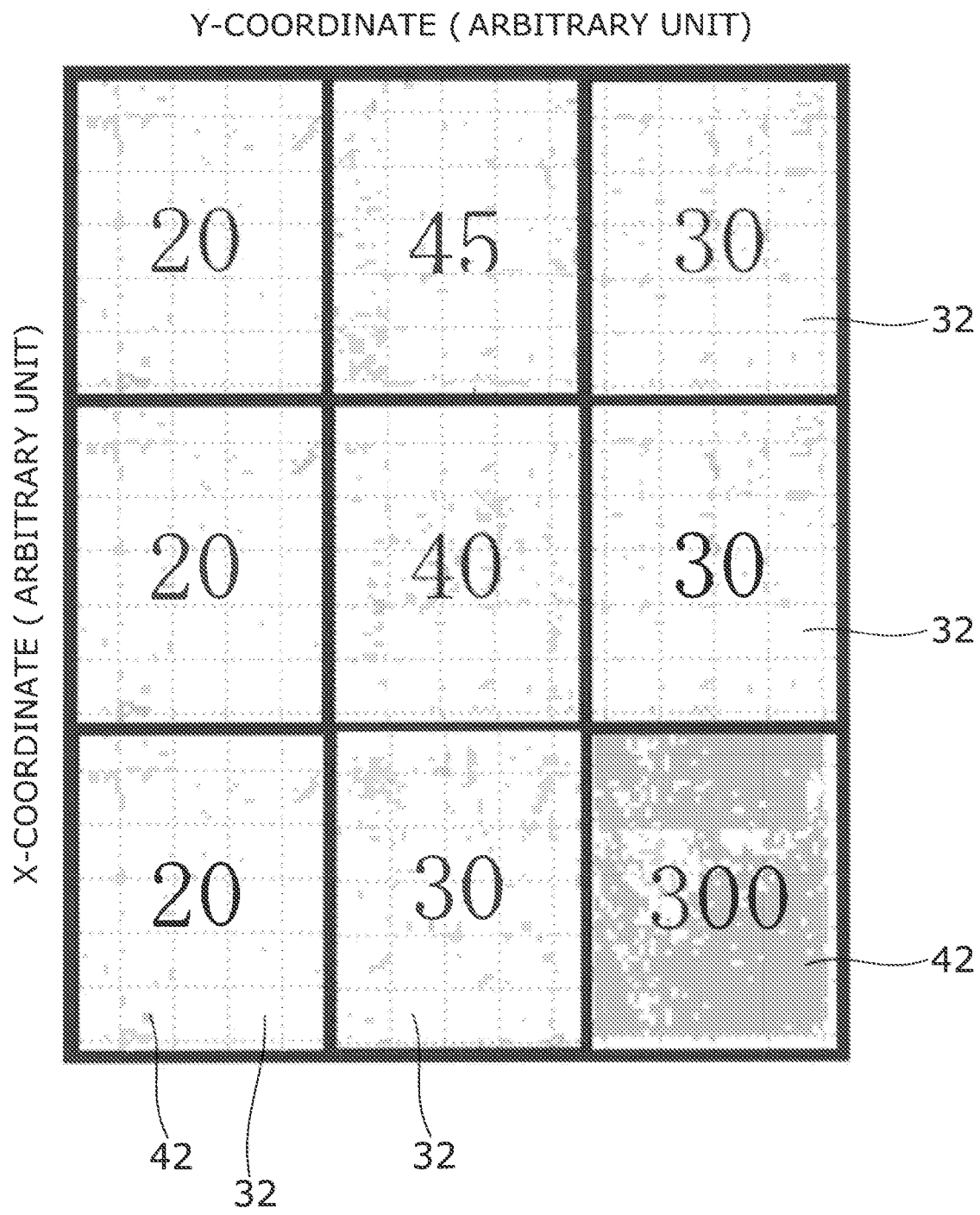
FIG. 9 illustrates an aggregation result of defects, where the horizontal axis represents horizontal position (Y-coordinate) on the glass substrate, the vertical axis represents vertical position (X-coordinate) on the glass substrate, and the surface of the glass substrate is divided vertically into three and horizontally into three, each of the divided regions serving as a monitored region.

FIG. 9 illustrates an aggregation result of defects, where the horizontal axis represents horizontal position (Y-coordinate) on the glass substrate, the vertical axis represents vertical position (X-coordinate) on the glass substrate, and the surface of the glass substrate is divided vertically into three and horizontally into three, each of the divided regions serving as a monitored region.

Figure 10:
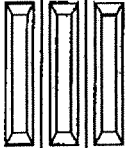
FIG. 10 illustrates a method for displaying a list of causal candidate apparatuses.
Figure 10:
Figure 10:
Figure 10:

FIG. 10 illustrates a method for displaying a list of causal candidate apparatuses.

As shown in FIG. 4, the manufacturing apparatuses 103 in the plant 112 are operated to manufacture liquid crystal panels. More specifically, as shown in FIG. 5, a plurality of electronic circuits 202 are formed on each glass substrate 201. Then the glass substrate 201 is divided into individual electronic circuits 202 and sealed with liquid crystal to manufacture a liquid crystal panel 203. In each process during this manufacturing, the surface of the glass substrate 201 is inspected by the inspection apparatus 104 to detect defects 204. Here, the processing result is outputted from each manufacturing apparatus 103 to the database 105, and the inspection result is outputted from the inspection apparatus 104 to the database 105.

In this condition, the plant 112 is monitored. First, in step S11 of FIG. 7, the alarm apparatus 11 configures the size of a monitoring unit region (pixel size) corresponding to each abnormality. The size of the monitoring unit region is empirically determined by the administrator 106 or others, and inputted beforehand to the alarm apparatus 11 through the LAN 107. For example, if the abnormality to be monitored is the occurrence of static electricity, the monitoring unit region is configured to be a relatively small region, illustratively a square region measuring 5 millimeters high and 5 millimeters wide. If the abnormality to be monitored is dust fall from above the substrate, the monitoring unit region is configured to be a relatively large region, illustratively a rectangular region measuring 300 millimeters high and 200 millimeters wide. Furthermore, the time period for monitoring abnormality, the number of aggregated substrates, and various reference values are also inputted beforehand to the alarm apparatus 11.

Next, in step S12, on the basis of the result of inspecting a prescribed number of glass substrates 201 (see FIG. 5) by the inspection apparatus 104 (see FIG. 4), the alarm apparatus 11 aggregates the number of defects for each monitoring unit region. Specifically, as shown in FIGS. 8 and 9, a two-dimensional rectangular coordinates are established on the surface of the inspected glass substrate 201 (see FIG. 5), and a figure is created in which coordinates corresponding to the coordinates on the glass substrate are established. In this figure, points 42 corresponding to defects detected on a prescribed number of glass substrates are plotted. That is, the coordinates of the point 42 in the figure are made equal to the coordinates of the defect on the glass substrate represented by this point.

Then, as shown in FIGS. 8 and 9, the surface of the glass substrate shown in these figures is divided into display unit regions 22 corresponding to the monitoring unit regions, and a numeral representing the number of defects is displayed in each display unit region 22. The number of defects serves as information indicating the degree of defects in each monitoring unit region. In FIG. 8, the surface of the glass substrate is divided vertically into nineteen and horizontally into fifteen, each of the divided regions serving as a monitoring unit region. In FIG. 9, the surface of the glass substrate is divided vertically into three and horizontally into three, each of the divided regions serving as a monitoring unit region. Also in these cases, a numeral representing the number of defects is displayed for each display unit region 22 corresponding to the monitoring unit region. The information indicating the degree of defects is not limited to the number of defects. The degrees of defects may be grouped into some ranks, and the rank may be displayed.

Next, in step S13, it is determined whether there is any monitoring unit region with the degree of defects being higher than a prescribed reference, that is, any defect concentration region. Specifically, when the degree of defects is represented by the number of defects, the monitoring unit region with the number of defects being higher than a prescribed number is designated as a defect concentration region. Then, if any defect concentration region is detected, control proceeds to step S14. Otherwise, control proceeds to step S19.

In step S14, the alarm apparatus 11 transmits an alarm to the administrator 106 through the LAN 107. At this time, along with the alarm, the type of abnormality and the aggregation result of defects shown in FIG. 8 or 9 are also outputted to the administrator 106. For example, only the alarm is transmitted to the administrator 106 by electronic mail, and the associated information such as the type of abnormality and the aggregation result is posted on a website. With regard to the aggregation result, for example, the figure shown in FIG. 8 or 9 is posted on a website. Thus, upon recognizing the occurrence of abnormality by electronic mail, the administrator 106 can refer to the above website to obtain necessary information. The transmission of an alarm and the output of the aggregation result in step S14 may be performed simultaneously with the output in step S18 described later.

Next, in step S15, on the basis of the history information inputted from the database 105 (see FIG. 4), that is, the information indicating which manufacturing apparatus 103 processed a particular product, the apparatus commonality is calculated for each manufacturing apparatus 103. The "apparatus commonality" represents the proportion of glass substrates processed by the particular manufacturing apparatus 103 to the glass substrates on which a defect concentration region is detected. That is, the apparatus commonality X (%) of a particular manufacturing apparatus is defined by the following formula (1):

$$X(\%) = B/A \times 100 \tag{1}$$

where A is the number of glass substrates on which a defect concentration region is detected, and B is the number of glass substrates processed by the particular manufacturing apparatus among the glass substrates (A substrates) on which a defect concentration region is detected.

Next, in step S16, it is determined whether, among the manufacturing apparatuses 103 (see FIG. 4), there is any manufacturing apparatus 103 with the apparatus commonality exceeding a prescribed reference value, that is, any causal candidate apparatus. Thus a causal candidate apparatus is extracted. If any causal candidate apparatus is extracted, control proceeds to step S17. Otherwise, control proceeds to step S19.

In step S17, among the glass substrates on which a defect concentration region is detected, the glass substrates processed by one of the causal candidate apparatuses extracted in step S16 are again subjected to aggregation of the number of defects for each monitoring unit region. This can clarify the position at which defects are concentrated for the glass substrates processed by the particular causal candidate apparatus. This reaggregation is performed for every causal candidate apparatus.

Next, control proceeds to step S18, where the alarm apparatus 11 outputs the list of causal candidate apparatuses extracted in step S16 and the reaggregation result calculated in step S17 to the administrator 106 through the LAN 107. The output of the reaggregation result is performed illustratively by posting a figure as shown in FIG. 8 or 9 on a website. The output of the list of causal candidate apparatuses is performed illustratively by posting a list of causal candidate apparatuses as shown in FIG. 10 on a website. FIG. 10 displays the inspection step in which a defect concentration region is detected, the associated degree of defects (defect level), the step (causal step) and apparatus (causal candidate apparatus) estimated to include occurrence of abnormality, and the commonality of the causal candidate apparatus. The display screen of the website is configured so that the administrator 106 can click on the button region of the "AGGREGATION MAP" shown in FIG. 10 to display the map shown in FIG. 8 or 9. After this output, control proceeds to step S19.

In step S19, if analysis has been completed for all types of abnormality to be analyzed, the operation of the alarm apparatus 11 is terminated. If there is any type of abnormality yet to be analyzed, control returns to step S11, where the monitoring unit region is reconfigured to continue analysis. Alternatively, even if analysis has been completed for all types of abnormality, the above operation sequence may be repeated by returning to step S11. In this case, the alarm apparatus 11 is constantly operated while repeatedly analyzing inspection results, and transmits an alarm to the administrator 106 if any abnormality is recognized.

Next, the effect of this example is described.

In this example, in step S12 of FIG. 7, for each abnormality responsible for defects, a monitoring unit region adapted to the abnormality is configured, and the number of defects is aggregated for each such monitoring unit region. Hence defect concentration due to various abnormalities can be detected. For example, it is possible to reliably sense defect concentration that cannot be noticed by an engineer aimlessly looking at the inspection result of defects, and defect concentration that cannot be detected by an inspection apparatus simply measuring the number of defects.

Furthermore, according to this example, in step S15, the apparatus commonality for each manufacturing apparatus is calculated for glass substrates on which a defect concentration region is detected. Hence apparatuses estimated to include occurrence of abnormality (causal candidate apparatuses) can be extracted. Thus it is possible to assist the administrator to identify manufacturing apparatuses responsible for defects.

Furthermore, in this example, in step S17, among the glass substrates on which a defect concentration region is detected, the glass substrates that passed through one of the causal candidate apparatuses are subjected to reaggregation of the number of defects for each monitoring unit region. Hence it is possible to recognize where on the glass substrate defects are caused by the particular causal candidate apparatus, and to assist the administrator to identify what type of abnormality occurs in the causal candidate apparatus.

Furthermore, in this example, as shown in FIGS. 8 and 9, the aggregation result is displayed by mapping the result to a figure provided with coordinates corresponding to the coordinates on the glass substrate. Thus the administrator can intuitively recognize the status of defect concentration on the glass substrate. Moreover, the relationship between adjacent monitoring unit regions and the trend of occurrence of defects on the overall glass substrate can also be easily recognized.

Furthermore, according to this example, in steps S12 and S17, the inspection results for a plurality of glass substrates are summed to aggregate the number of defects. This allows highly stable analysis with small dispersion.

Furthermore, in this example, when abnormality occurs, the alarm itself is provided by directly sending an electronic mall to the administrator, whereas the information associated with the alarm is posted on a website. Hence the administrator can reliably and rapidly recognize the occurrence of abnormality, and can efficiently obtain necessary information associated with the alarm through a website having well-designed page structure and layout.

Thus, according to this example, it is possible to reduce the lead time from the occurrence of abnormality in the plant until detecting the abnormality, identifying the causal manufacturing apparatus, and taking measures. That is, it is possible to provide early detection of abnormality and early response thereto, thereby avoiding decreased yield. With regard to chronic defects, each cause can be identified and isolated. Thus the baseline yield of the plant can be improved.

In this example, the size of the monitoring unit region is empirically determined by the administrator and inputted to the alarm apparatus. The reason for this is as follows. In general, even if any defect is detected in a product under manufacturing, the product does not always become a nonconforming product upon completion. Hence the yield cannot be effectively improved simply by measuring the number of defects and determining abnormality in products under manufacturing. Furthermore, such presence of defects not contributing to the yield acts as noise, which prevents the detection of serious defects responsible for nonconforming products. However, it is empirically known that concentrated occurrence of defects in a region of particular size on the substrate during manufacturing results in a large number of nonconforming products. In this example, through the proactive use of this empirical knowledge, the yield of the plant can be effectively improved.

Next, a first variation of this example is described.

Figure 11:
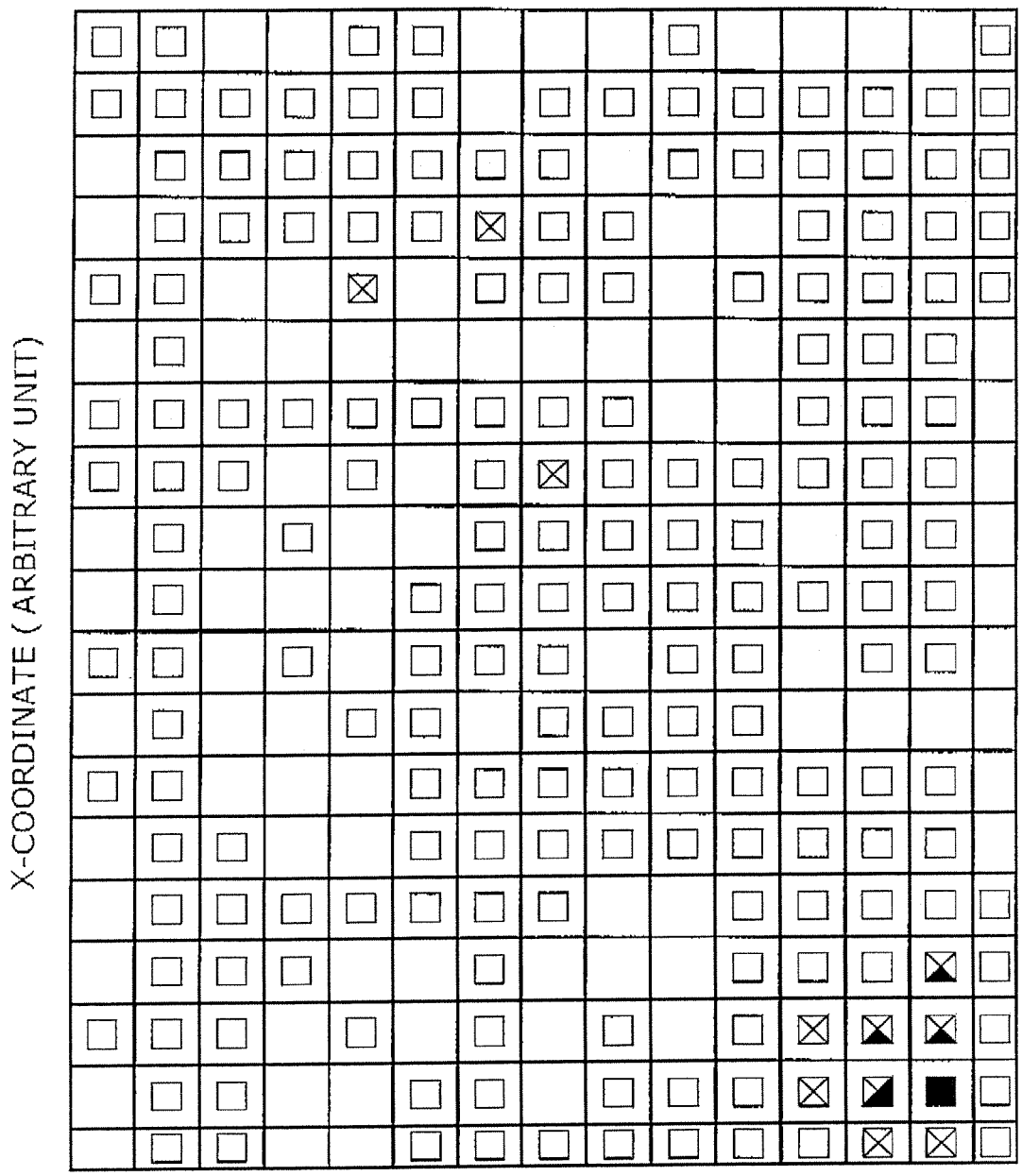
FIG. 11 illustrates an aggregation result of defects in a first variation of the first example, where the horizontal axis represents horizontal position (Y-coordinate) on the glass substrate, and the vertical axis represents vertical position (X-coordinate) on the glass substrate.

FIG. 11 illustrates an aggregation result of defects in a first variation of the first example, where the horizontal axis represents horizontal position (Y-coordinate) on the glass substrate, and the vertical axis represents vertical position (X-coordinate) on the glass substrate. FIG. 11 shows the same result as the inspection result shown in FIG. 9.

In the first example described above with reference to FIGS. 8 and 9, the aggregation result outputted to the administrator represents each defect by a point and the number of defects for each monitoring unit region by a numeral. In contrast, as shown in FIG. 11, in the outputted aggregation result of this variation, the degree of occurrence of defects in each monitoring unit region is classified into some ranks by the number of defects, and each rank is represented by a mark with a particular color. In FIG. 11, for convenience, each mark with a particular color is represented by a symbol such as a rectangle (□), a rectangle (□) with a cross (x) inside, or a rectangle (□) partially or completely filled in.

For example, the degrees of defects are classified into six ranks for each monitoring unit region. A red mark is placed in the monitoring unit region with the highest rank of the degree of defects, that is, with the largest number of defects. A yellow mark is placed in the monitoring unit region with the second highest rank of the degree of defects. A green mark is placed in the monitoring unit region with the third highest rank of the degree of defects. A light blue mark is placed in the monitoring unit region with the fourth highest rank of the degree of defects. A dark blue mark is placed in the monitoring unit region with the fifth highest rank of the degree of defects. Finally, no mark is placed in the monitoring unit region free from defects. Thus the administrator can visually grasp the concentration state of defects. The configuration, operation, and effect of this variation other than the foregoing are the same as that of the first example described above.

Next, a second variation of this example is described.

Figure 12:
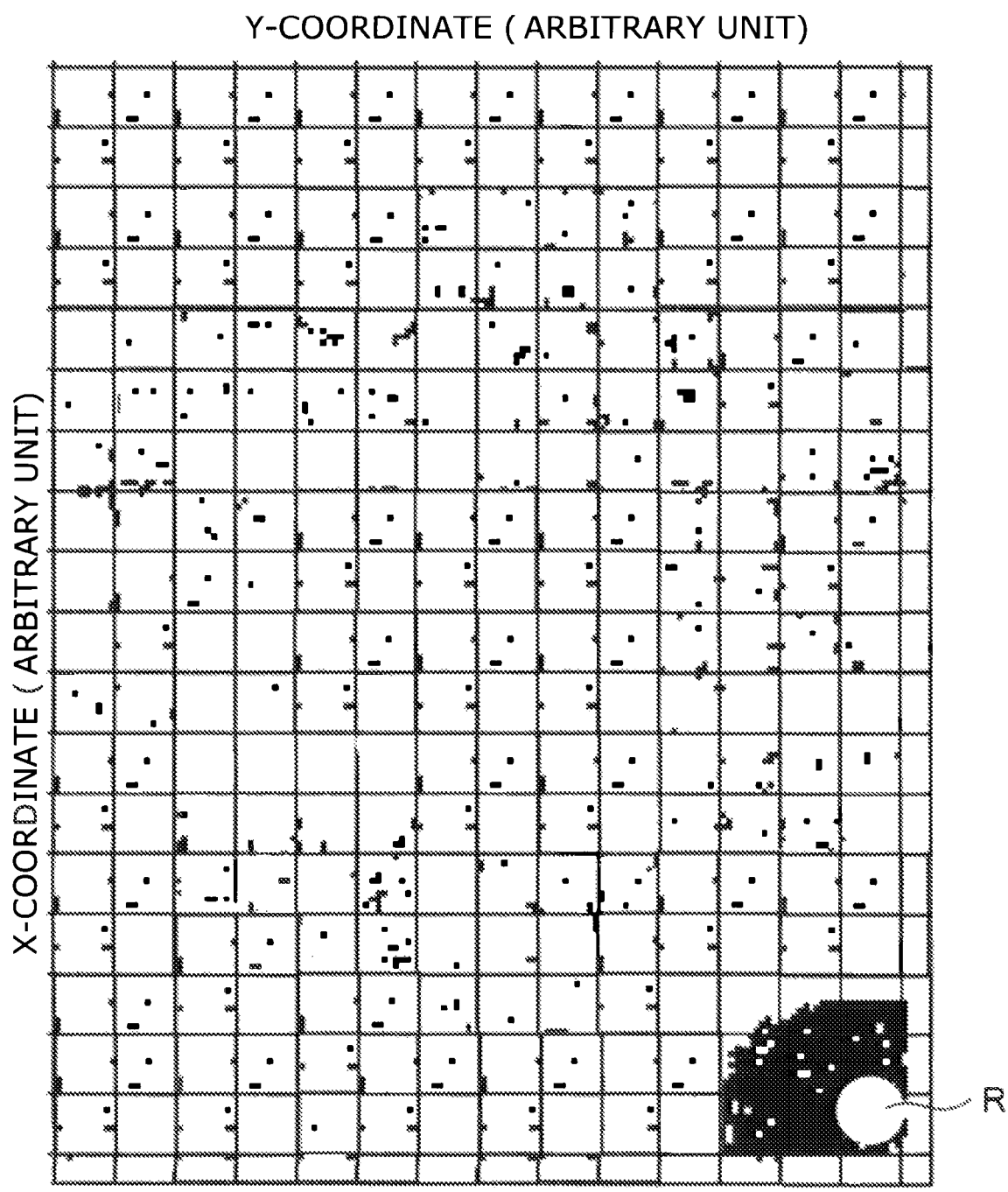
FIG. 12 illustrates an aggregation result of defects in a second variation of the first example, where the horizontal axis represents horizontal position (Y-coordinate) on the glass substrate, and the vertical axis represents vertical position (X-coordinate) on the glass substrate.

FIG. 12 illustrates an aggregation result of defects in a second variation of the first example, where the horizontal axis represents horizontal position (Y-coordinate) on the glass substrate, and the vertical axis represents vertical position (X-coordinate) on the glass substrate. FIG. 12 shows the same result as the inspection result shown in FIGS. 9 and 11.

As shown in FIG. 12, this variation is different from the first example described above in that the aggregation result of defects is shown by marking only the defect concentration region rather than by showing the aggregation result of defects for every monitoring unit region. That is, in the display screen of the aggregation result, a red mark R is placed only in the defect concentration region, and no mark is placed in the other monitoring unit regions. Thus the defect concentration region can be highlighted, allowing the administrator to more easily grasp the concentration state of defects. The configuration, operation, and effect of this variation other than the foregoing are the same as that of the first variation of the first example described above.

Next, a third variation of this example is described.

This variation is different from the first variation of the first example described above in that the aggregation result of defect is shown by grouping the aggregation results of a plurality of contiguous monitoring unit regions into one result. That is, the display unit region for displaying the aggregation result is configured to be a larger region than the monitoring unit region. This makes the aggregation result more viewable to the administrator, and the administrator can easily grasp the overall trend of the concentration state of defects. This variation is particularly effective when the monitoring unit region is configured to be small. The configuration, operation, and effect of this variation other than the foregoing are the same as that of the first variation of the first example described above.

Next, a fourth variation of this example is described.

Figure 13:
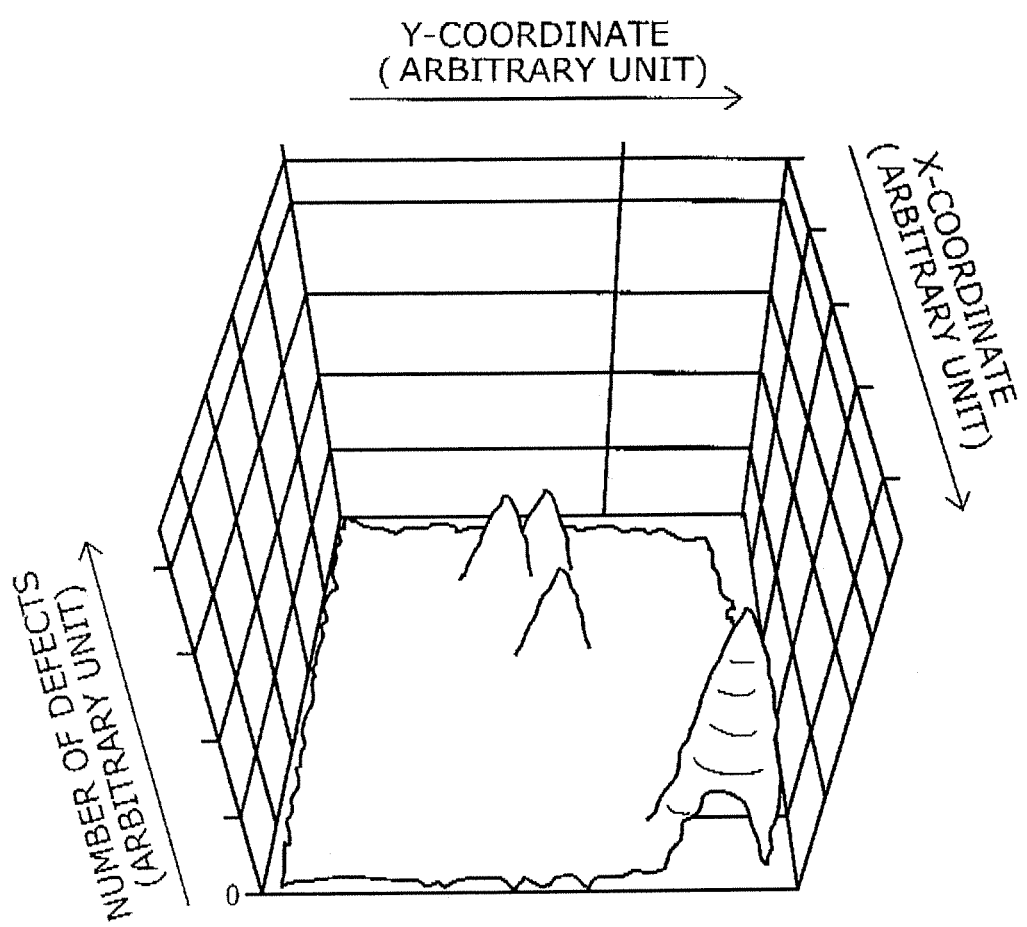
FIG. 13 is a three-dimensional distribution diagram illustrating an aggregation result of defects in a fourth variation of the first example, where the X-axis represents vertical position (X-coordinate) on the glass substrate, the Y-axis represents horizontal position (Y-coordinate) on the glass substrate, and the Z-axis represents the degree of defects.

FIG. 13 is a three-dimensional distribution diagram illustrating an aggregation result of defects in a fourth variation of the first example, where the X-axis represents vertical position (X-coordinate) on the glass substrate, the Y-axis represents horizontal position (Y-coordinate) on the glass substrate, and the Z-axis represents the degree of defects FIG. 13 shows the same result as the inspection result shown in FIG. 9.

As shown in FIG. 13, this variation is different from the first example described above in that the aggregation result of defects is shown as a stereoscopic distribution of the concentration state of defects using a three-dimensional distribution diagram. Thus the defect concentration region can be highlighted, allowing the administrator to grasp the overall trend of the concentration state of defects easily and quantitatively. The configuration, operation, and effect of this variation other than the foregoing are the same as that of the first variation of the first example described above.

In showing the aggregation result of defects, the method for highlighting the defect concentration region is not limited to the second to fourth variations described above. For example, in the first variation, the brightness of the marks can be varied so that the mark representing the defect concentration region is displayed brightly. A "balloon" may be displayed near the defect concentration region.

Next, a second example is described.

The alarm apparatus according to this example serves to monitor a plant for manufacturing semiconductor chips, although the configuration of the alarm apparatus is the same as that of the first example described above.

Figure 14:
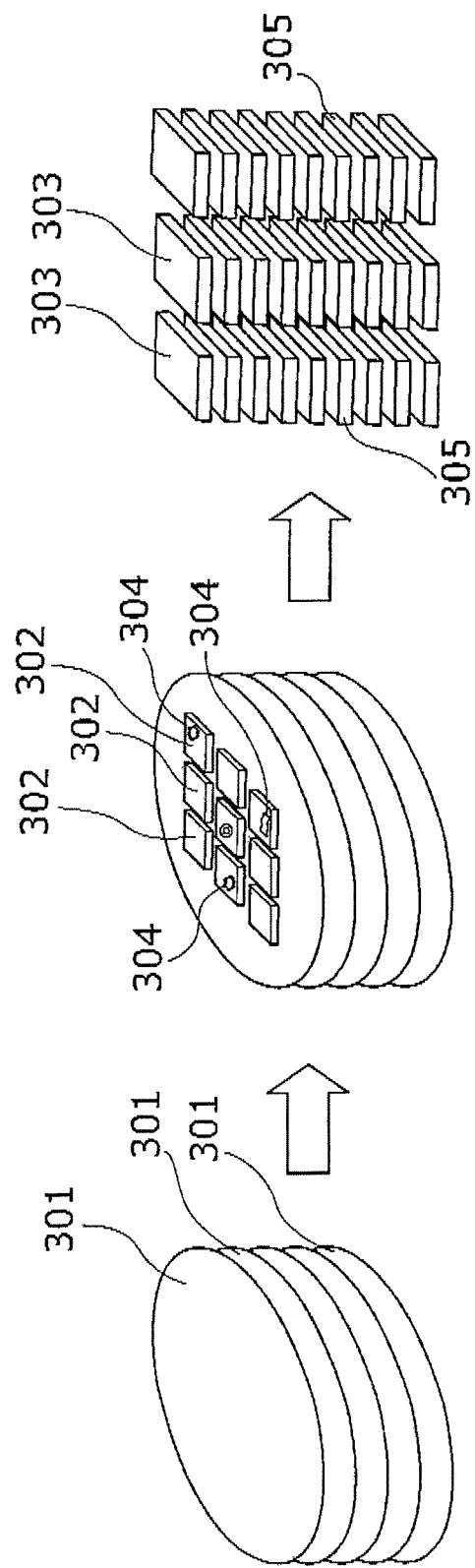
FIG. 14 schematically illustrates a method for manufacturing semiconductor chips.

FIG. 14 schematically illustrates a method for manufacturing semiconductor chips.

As shown in FIG. 14, in the process for manufacturing semiconductor chips, a plurality of electronic circuits 302 are first formed as precursor structures on wafers 301 illustratively made of single crystal silicon. Next, the wafer 301 is diced into individual electronic circuits 302. Thus semiconductor chips 303 are fabricated. The foregoing is a brief description. In reality, manufacturing semiconductor chips needs hundreds of steps. In the plant for manufacturing semiconductor chips, each step is processed in parallel by a plurality of manufacturing apparatuses. Hence the passage route of semiconductor chips in the plant depends on the associated lot.

Here, abnormality occurring in one manufacturing apparatus of one step results in increasing the possibility that a defect occurs in the semiconductor chip passing through this manufacturing apparatus. For example, when abnormality occurs in the manufacturing apparatus responsible for part of the process for manufacturing electronic circuits 302, a defect 304 occurs in the electronic circuit 302 formed by this manufacturing apparatus, and the semiconductor chip 303 including this defect 304 becomes a nonconforming chip 305.

In this example, using a method similar to that in the first example described above, the alarm apparatus monitors the trend of occurrence of defects 304 on the basis of the inspection result for wafers 301 to detect the occurrence of abnormality in the plant, and transmits an alarm to the plant administrator when abnormality occurs.

The alarm apparatus according to any one of the first to fourth variation of the first example described above can also be applied to monitoring the plant for manufacturing semiconductor chips. That is, in the second example, the defect concentration region can be highlighted in the output of the aggregation result of defects as in the variations of the first example.

In the above examples, the transmission of alarms and the output of results are performed at times in the course of analysis. However, the transmission of alarms and the output of results may be performed collectively after completion of analysis for all types of abnormality to be analyzed.

In the above examples, the alarm is transmitted by electronic mail, and the information associated with the alarm is posted on a website. However, the invention is not limited thereto, but both the alarm and the associated information may be transmitted to the administrator by electronic mail. Alternatively, a display apparatus, printer, or speaker may be connected to the alarm apparatus and used for output of the alarm content by display, print, or voice. Thus the alarm may be transmitted at the place where the alarm apparatus is installed without the intermediary of the electronic network.

The information from the manufacturing apparatuses and inspection apparatuses in the plant may be directly inputted to the alarm apparatus without the intermediary of the database. Alternatively, such information may be recorded on some media, and a human operator may carry the media to the alarm apparatus, so that the alarm apparatus can retrieve the information from the media.

In the above examples, after detecting the detect concentration region, the alarm apparatus calculates the apparatus commonality for the manufacturing apparatuses to extract the causal candidate apparatus. However, the invention is not limited thereto. After detecting the detect concentration region, it is possible to calculate any one or more of chamber commonality, sheet position commonality, chip position commonality, product type commonality, material commonality, and recipe commonality, in addition to or instead of the apparatus commonality. Thus the cause of defects can be estimated when the cause resides in the chamber, sheet position, chip position, product type, material, or recipe.

The invention claimed is:

1. An alarm apparatus for sensing occurrence of abnormality in a plant that manufactures products by processing substrates, the alarm apparatus comprising:

means responsive to an inspection result of a surface of the substrates during manufacturing the products for aggregating degree of occurrence of defects for each monitoring unit region to produce an aggregation result, the monitoring unit region being configured by dividing a surface of the substrate and having a prescribed size configured for each type of the abnormality, the degree of occurrence of defects being aggregated by summing the inspection results of a plurality of the substrates;

means for comparing the degree of occurrence of defects in each of the monitoring unit regions with a reference;

means responsive to detection of the monitoring unit region with the degree of occurrence of defects being higher than the reference for transmitting an alarm and outputting the aggregation result;

means for determining whether there is any manufacturing apparatus used in processing a prescribed proportion or more of the substrates on which the monitoring unit region with the degree of occurrence of defects being higher than the reference is detected; and means responsive to presence of the manufacturing apparatus used in processing the prescribed proportion or more of the substrates for outputting, along with the alarm and the aggregation result, information indicating the manufacturing apparatus used in processing the prescribed proportion or more of the substrates.

2. The alarm apparatus according to claim 1, further comprising:

means responsive to presence of the manufacturing apparatus used in processing the prescribed proportion or more of the substrates for aggregating the degree of occurrence of defects for each of the monitoring unit regions to produce an aggregation result with regard to only the substrates processed by the manufacturing apparatus used in processing the prescribed proportion or more of the substrates among the substrates on which the monitoring unit region with the degree of occurrence of defects being higher than the reference is detected; and means for outputting the aggregation result.

3. The alarm apparatus according to claim 1, wherein the aggregation result is outputted by:

creating a figure provided with coordinates corresponding to coordinates on the substrate; and displaying information indicating the defect at a position in the figure, the position corresponding to a position of occurrence of the defect on the substrate.

4. The alarm apparatus according to claim 3, wherein, in the display of the figure, the monitoring unit region with the degree of occurrence of defects being higher than the reference is highlighted.

5. The alarm apparatus according to claim 4, wherein, in the display of the figure, a mark is placed in the monitoring unit region with the degree of occurrence of defects being higher than the reference, and no mark is placed in the other monitoring unit regions.

6. The alarm apparatus according to claim 3, wherein, in the display of the figure, the inspection result of the substrate is shown for each region having a different size from that of the monitoring unit region.

7. The alarm apparatus according to claim 1, wherein the products are liquid crystal panels.

8. The alarm apparatus according to claim 1, wherein the products are semiconductor devices.

9. A manufacturing method for manufacturing products by processing substrates, the method comprising:
- inspecting a surface of the substrates during manufacturing the products and aggregating degree of occurrence of defects for each monitoring unit region to produce an aggregation result, the monitoring unit region being configured by dividing a surface of the substrate and having a prescribed size configured for each type of the abnormality, the degree of occurrence of defects being aggregated by summing the inspection results of a plurality of the substrates;
- comparing the degree of occurrence of defects in each of the monitoring unit regions with a reference;
- transmitting an alarm and outputting the aggregation result if the monitoring unit region where the degree of occurrence of defects is higher than the reference is detected;
- determining whether there is any manufacturing apparatus used in processing a prescribed proportion or more of the substrates on which the monitoring unit region with the degree of occurrence of defects being higher than the reference is detected; and
- outputting, along with the alarm and the aggregation result, information indicating the manufacturing apparatus used in processing the prescribed proportion or more of the substrates if the manufacturing apparatus used in processing the prescribed proportion or more of the substrates is present.

10. The manufacturing method according to claim 9, further comprising:
- aggregating the degree of occurrence of defects for each of the monitoring unit regions to produce an aggregation result with regard to only the substrates processed by the manufacturing apparatus used in processing the prescribed proportion or more of the substrates among the substrates on which the monitoring unit region with the degree of occurrence of defects being higher than the reference is detected if the manufacturing apparatus used in processing the prescribed proportion or more of the substrates is present; and
- outputting the aggregation result.

11. The manufacturing method according to claim 9, wherein the aggregation result is outputted by:
- creating a figure provided with coordinates corresponding to coordinates on the substrate; and
- displaying information indicating the defect at a position in the figure, the position corresponding to a position of occurrence of the defect on the substrate.

12. The manufacturing method according to claim 11, wherein, in the display of the figure, the monitoring unit region with the degree of occurrence of defects being higher than the reference is highlighted.

13. The manufacturing method according to claim 12, wherein, in the display of the figure, a mark is placed in the monitoring unit region with the degree of occurrence of defects being higher than the reference, and no mark is placed in the other monitoring unit regions.

14. The manufacturing method according to claim 11, wherein, in the display of the figure, the inspection result of the substrate is shown for each region having a different size from that of the monitoring unit region.

15. The manufacturing method according to claim 9, wherein the products are liquid crystal panels.

16. The manufacturing method according to claim 9, wherein the products are semiconductor devices.

* * * * *